United States Patent
Monroe et al.

[11] Patent Number: 5,975,255
[45] Date of Patent: Nov. 2, 1999

[54] QUICK-CHANGE BRAKE SHOE

[76] Inventors: James J. Monroe, 130 Jefferson St., Burnsville; Glenn Cunningham, 43 Lennon Ave., Tishomingo, both of Miss.

[21] Appl. No.: 08/853,485

[22] Filed: May 9, 1997

[51] Int. Cl.⁶ .................................................... F16D 69/00
[52] U.S. Cl. .................................. 188/250 D; 188/250 B
[58] Field of Search ...................... 188/234, 206, 188/235, 242, 247, 252, 258, 250 D, 330, 250 A, 250 C, 250 G; 411/389

[56] References Cited

U.S. PATENT DOCUMENTS

| | | | |
|---|---|---|---|
| 1,052,281 | 2/1913 | Saulpaw . | |
| 1,926,064 | 9/1933 | Sawtelle | 29/152.1 |
| 1,949,670 | 3/1934 | Winters | 188/250 B |
| 2,022,435 | 11/1935 | Sanford | 188/78 |
| 2,139,409 | 12/1938 | Hunter | 188/234 |
| 2,291,525 | 7/1942 | Bessey | 188/242 |
| 2,361,307 | 10/1944 | Merritt | 188/234 |
| 3,408,887 | 11/1968 | Villo | 411/389 X |
| 4,771,870 | 9/1988 | Belk | 188/250 D |
| 4,775,036 | 10/1988 | Harrison | 188/250 B |
| 4,867,285 | 9/1989 | Gatlin | 188/250 D |
| 5,137,203 | 8/1992 | Johannsen | 288/146 |
| 5,255,762 | 10/1993 | Beri | 188/250 G |
| 5,429,215 | 7/1995 | King | 188/250 C |
| 5,443,133 | 8/1995 | Dreilich | 188/250 G |
| 5,469,942 | 11/1995 | Krumm | 188/250 G |

*Primary Examiner*—Robert J. Oberleitner
*Assistant Examiner*—Mariano Sy
*Attorney, Agent, or Firm*—Terry M Gernstein

[57] ABSTRACT

A brake shoe includes two rails each having an arcuate body with prong-receiving notches defined therein, as well as anchor-receiving notches defined therein. A strut-forming anchor element extends between the two rails and has threaded ends that extend through holes defined through the rail bodies in the anchor-receiving notches. Two brake pad supporting plates are mounted on the rails and each has two prongs adjacent to each rail body in position to be received in the prong-receiving notches. Anchors are mounted on the brake pad supporting plates to be received in the anchor-receiving notches and have holes defined therethrough. The ends of the strut-forming anchor elements are received through the holes in the rails and the holes defined through the anchors and have nuts threadably attached thereto to attach the strut-forming elements to the rails. One form of the rail has the anchor-receiving notches omitted and the prong-receiving notches defined completely through the rail body.

11 Claims, 3 Drawing Sheets

QUICK-CHANGE BRAKE SHOE

TECHNICAL FIELD OF THE INVENTION

The present invention relates to the general art of vehicle brake systems, and to the particular field of brake shoes.

BACKGROUND OF THE INVENTION

Changing brakes and brake parts can be a difficult, expensive and time-consuming job. Often, such a job requires special tools which are only available at a service station or at a special repair shop. Still further, some brake replacement jobs require special knowledge and skills and thus cannot be carried out on the road or by the vehicle owner/owner by himself. Still further, such jobs often require removal of the tire, seals or the like and may cause loss of oil. A jack may be necessary as well. All of these requirements make such jobs difficult.

While the art does have brake parts that are intended to be replaceable, there is a need for brake parts that can be easily changed without the need for special tools, conditions, skills or the like.

Furthermore, such replacement parts should be secure, stable and strong once installed so they are reliable.

Therefore, there is a need for a brake shoe which is strong, reliable and stable while still being easy and efficient to remove, replace and install.

OBJECTS OF THE INVENTION

It is a main object of the present invention to provide a brake shoe that is easy and efficient to install.

It is another object of the present invention to provide a brake shoe that can be installed without the need of special tools, skills or conditions.

It is another object of the present invention to provide a brake shoe that is strong and stable once installed.

It is another object of the present invention to provide a brake shoe that is capable of use in any position.

It is another object of the present invention to provide a brake shoe that can be installed on the road by the vehicle owner/operator by himself.

It is another object of the present invention to provide a brake shoe that does not require the use of a jack during the installation.

It is another object of the present invention to provide a brake shoe that does not require removal of the vehicle tire.

It is another object of the present invention to provide a brake shoe that does not require removal of an oil seal during installation.

It is another object of the present invention to provide a brake shoe that does not require special mechanic's skills to remove, replace and install.

SUMMARY OF THE INVENTION

These, and other, objects are achieved by a quick change brake shoe which has a rail with notches defined therein and a brake pad plate with prongs that are accommodated in those notches when the pad plate is in place on the rail. A threaded fastener supports the rails to maintain strength and relative orientation of the rails, while the prongs and notches co-operate to keep the brake part strong and stable while still permitting changing brakes with only a single tool, such as a 9/16 wrench.

BRIEF DESCRIPTION OF THE DRAWING FIGURES

FIG. 1 is an inside view of a prior art vehicle wheel brake system illustrating the orientation of the brake shoes, pads and the like.

DETAILED DESCRIPTION OF THE PREFERRED EMBODIMENT OF THE INVENTION

Figure 1:
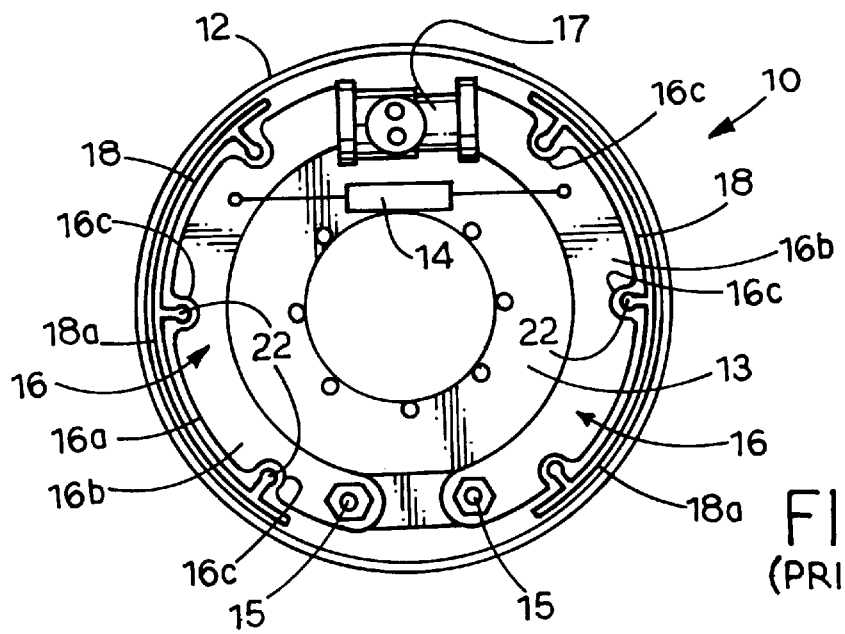

Shown in FIG. 1 is a prior art brake assembly 10 which includes a wheel brake drum 12, a brake drum outside wall 13, a spring 14 which holds brake shoes 16, 16A and 16C normally in a brake-released position. An anchor pin 15 pivotally holds the brake shoes in position. A hydraulic piston 17 operates the brake mechanism into braking position and a brake lining is shown at 18 and 18A.

Figure 2:
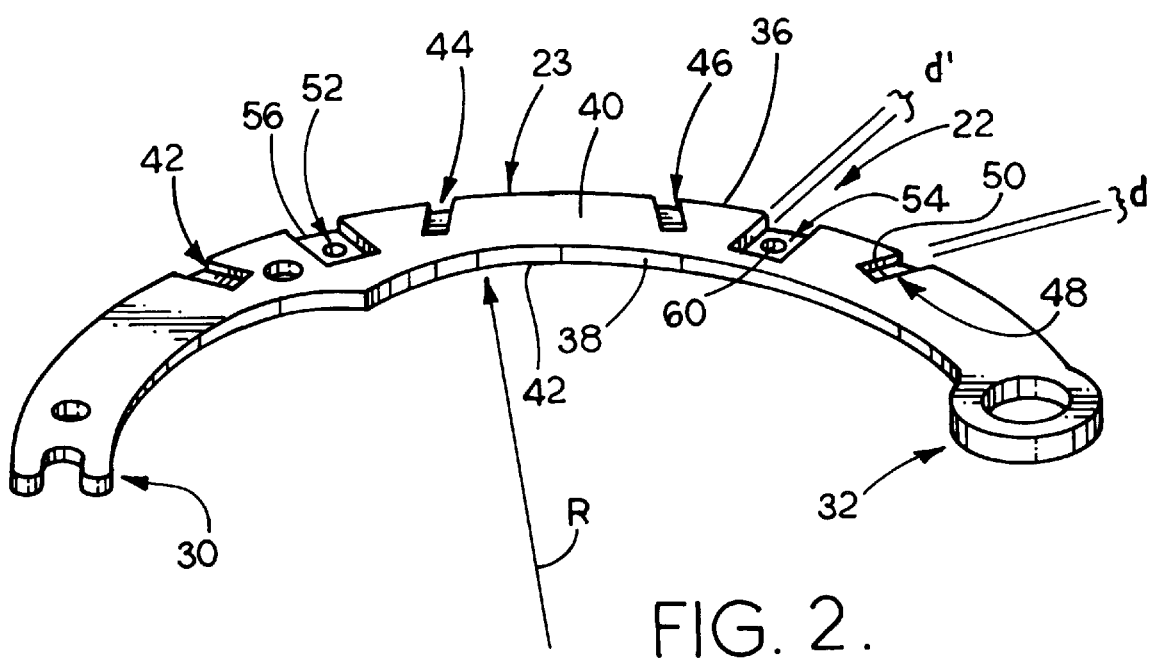
FIG. 2 is a perspective view of a rail used in the brake shoe of the present invention.
Figure 3:
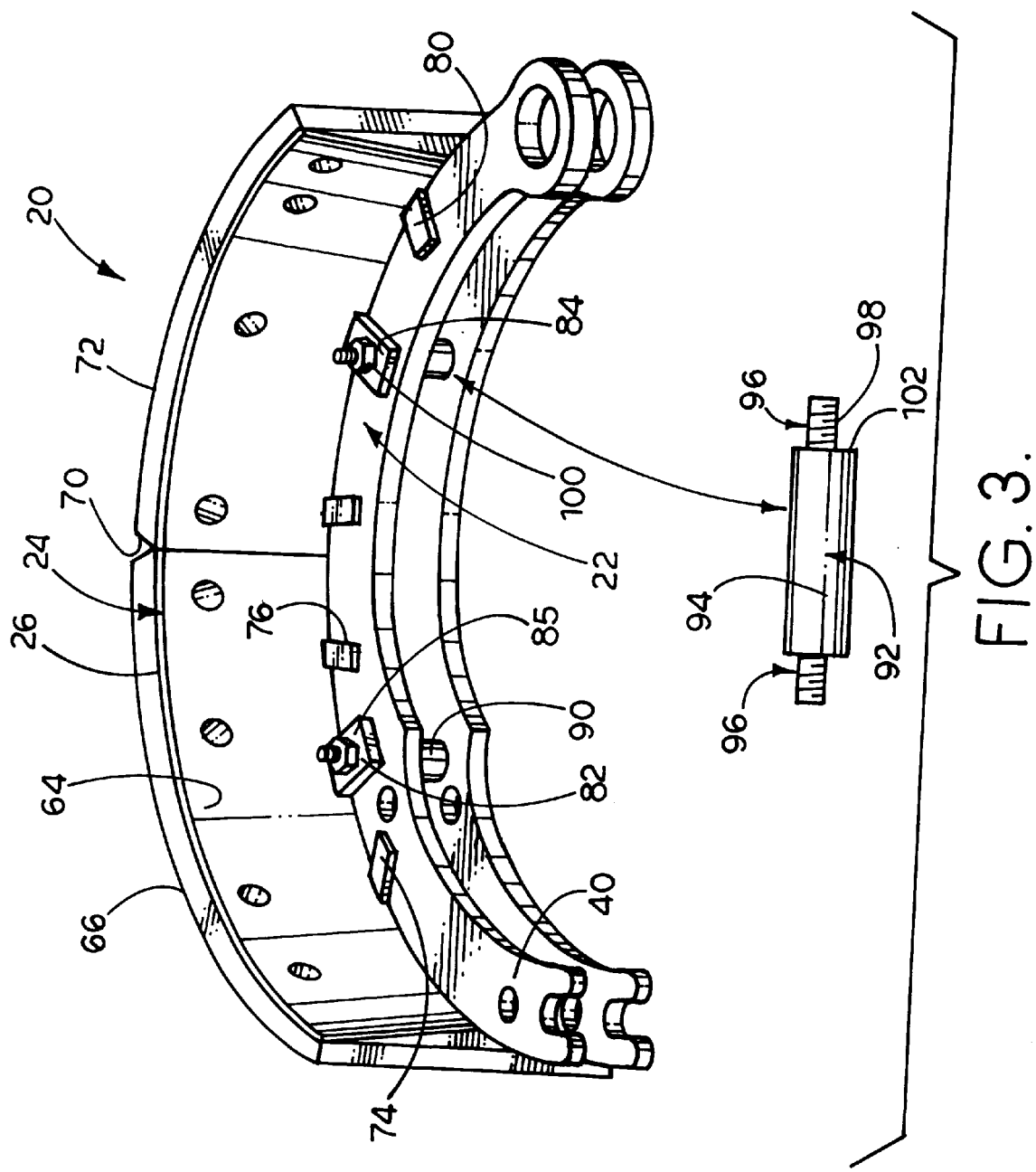
FIG. 3 is a rail/brake pad combination of the brake shoe of the present invention.

Referring next to FIGS. 2 and 3, a brake shoe 20 embodying the present invention is shown as broadly including a rail 22 on which is supported brake pads 24 via plates 26. There are two rails which are identical to each other and two brake pads and plates which also are identical to each other. Therefore, only one item of each will be described, it being understood that the description applies to both items.

Referring specifically to FIG. 2, a rail has an arcuate body 23 having ends 30 and 32 having the usual elements used to mount such rails in the brake assembly. The radius of curvature of rail body 23 is indicated in FIG. 2 by R. Rail body 23 also includes a top rim 36, a bottom rim 38, an outside surface 40 and an inside surface 42 and is formed of materials usual to such elements. The rail body has a thickness t defined between surfaces 40 and 42.

Two pairs of notches 42, 44 and 46, 48 are defined in rail body 23 to extend inwardly from outside surface 40 towards inside surface 42. The notches extend for part of the thickness t of the rail body. Each of the notches has a depth d as measured between outside surface 40 and bottom surface 50 that does not exceed one-half the thickness t. Preferably, depth d equals one-half thickness t.

Notches 42 and 44 are angled toward each other in order to lie on secants of the arc defined by arcuate rail body 23. Notches 46 and 48 are also angled toward each other to lie on secants of the arcuate rail body. One preferred form of the rail has the notches in each notch pair forming an angle of 60° with each other as indicated at angle θ. This angular orientation of the notches provides stability to the brake pads mounted on rail 22. The angular orientation causes the brake pad plates to be securely and stably attached to the rail whereby there will be no motion or looseness in the mounting, and permits the rail to regain strength that may be lost due to the notches when the brake pad plates are mounted thereon as will be understood from the following discussion.

One form of the brake assembly includes a rail body 23 shown in FIG. 2 and which includes two anchor-receiving notches, 52 and 54 defined therein between pairs of notches 42, 44 and 46, 48 respectively. Each anchor-receiving notch includes a base, such as base 56 that is defined in the rail body to be spaced from outside surface 40 by a depth d'. Depth d' is equal to depth d described above, and does not exceed one-half thickness t, and preferably is equal to one-half thickness t. Each anchor-receiving notch lies on a radius of the rail body. An anchor-receiving hole, such as hole 60, is defined through rail body 23 in each anchor-receiving notch.

From the foregoing discussion, it will be understood that inside surface 42 of the rail body is smooth and uninterrupted with the exception of the holes, such as holes 60, defined through the rail body. The notches are all on the outside surface of the rail body.

Referring next to FIG. 3, it can be seen that brake shoe 20 has two brake pad plates 26. Each plate 26 is arcuate to match the curvature of the brake rail bodies and includes a bottom surface 64 and a top surface 66 on which the brake pads 24 are mounted. Each brake pad includes a bevelled edge, such as edge 70 located to be adjacent to a bevelled edge of the adjacent brake pad. As will be understood by those skilled in the art, each of the brake pads has a braking surface 72 that will be used in the usual manner.

Each brake pad plate includes a pair of prongs 74 and 76 located on bottom surface 64 to be received in notches, such as notches 42 and 44 of a rail body. As will be understood, there are two pairs of prongs on each pad, one pair for each rail body. Each prong has a thickness which slightly exceeds depth d whereby the outer surface 80 of each prong will be spaced from outside surface 40 of a rail body when the pad plate is in position on the rail body. In this manner, the prongs will replace the material removed from the rail body to define the notches thereby restoring strength to the rail body. The angled orientation of the notches and prongs acts to grasp the rail so the plates are mounted in a secure manner.

Each plate 26 further includes an anchor element, such as anchor elements 82 and 84, dependingly mounted on bottom surface 64 to be received in fastener-accommodating notches 52 and 54 respectively. Each anchor element has a thickness measured between outer surface 85 and an inner surface not visible in FIG. 3, that slightly exceeds depth d' of the fastener-accommodating holes whereby outer surface 85 is spaced above outside surface 40 of the rail body when the plates are in position on the rail bodies. This thickness difference also adds material back to the rail as above discussed with regard to prongs 74 and 76. Each anchor element also includes a hole defined therethrough to be aligned with hole 60 in the rail body.

Each brake shoe 20 further includes two anchor elements, 90 and 92, extending between rail bodies. The anchor elements are identical, therefore, only anchor element 92 will be described. Anchor element 92 includes a central body 94 with a threaded element 96 on each end thereof. Elements 96 include external threads, such as thread 98, which co-operate with the threads in a fastener element, such as nut 100, to secure elements 90 and 92 in place on the rail 22. Elements 96 extend through the holes 60 defined in the rail bodies and have shoulder 102 that abut inside surface 42 of the rail bodies adjacent to the holes 60. Tightening nuts 100 will draw the rail bodies tightly against the elements 90 and 92 so those elements 90 and 92 act as strengthening struts for the rail system. The elements 90 and 92 serve to maintain rail bodies 23 in the desired orientation with respect to each other.

Figure 4:
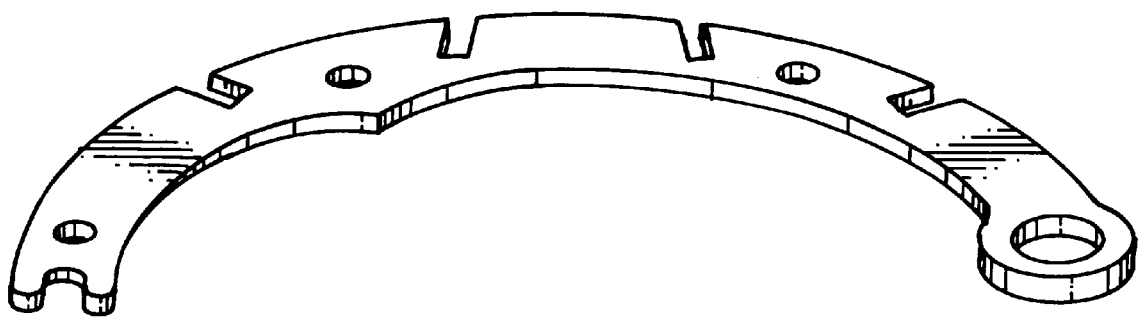
FIG. 4 is another form of the rail of the brake shoe combination of the present invention.

Another form of the rail is shown in FIG. 4 as rail 22'. Rail 22' is similar to rail 22, but has anchor-receiving notches omitted and notches 42' defined completely through the rail. Holes 60 are also omitted. The rails are permanently fastened and do not spread apart and elements 90 and 92 are permanent and are not replaced when changing brakes.

From the foregoing, it can be understood that replacement of brake pads is quite simple using the system of the present invention. Nuts 100 are simply removed using a wrench, such as a 9/16 wrench, or the like, and the pad plates 26 are removed. New pad plates are placed on the rails, and the job is complete.

It is understood that while certain forms of the present invention have been illustrated and described herein, it is not to be limited to the specific forms or arrangements of parts described and shown.

We claim:

1. A brake shoe comprising:

A) two rails each having an arcuate body with a top rim, a bottom rim, and an outer surface extending between said top rim and said bottom rim;

B) two pairs of prong-receiving notches defined in the outer surface of each rail body, each prong-receiving notch extending from the top rim of each rail toward the bottom rim, each prong-receiving notch being angled toward the adjacent prong-receiving notch of the pair of prong-receiving notches with each prong-receiving notch extending along a secant of the arcuate body;

C) two pad supporting plates mounted on said rail bodies, each plate including a top surface, a bottom surface, two pairs of prongs each extending upward from said bottom surface at an angle corresponding to the angles of said prong-receiving notches so each prong extends above said bottom surface and is received in a corresponding prong-receiving notch when a pad plate is mounted on the top rim of a rail body;

D) two anchor-receiving notches defined in the outer surface of each rail;

E) a fastener-accommodating hole defined through each rail in each anchor-receiving notch;

F) an anchor in each of said two anchor-receiving notches; and

G) an anchor element extending between the two rail bodies and having two fastener ends, each fastener end being received through a fastener-accommodating hole and received by the anchor in the anchor-receiving notch associated with the fastener-accommodating hole.

2. The brake shoe defined in claim 1 wherein said anchor element includes external threads on each end thereof, a shoulder defined adjacent to the external threads and a central body having an outer dimension larger than the fastener-accommodating holes whereby said shoulder abuts an inside surface of each rail body when said anchor element is in place.

3. The brake shoe defined in claim 2 wherein each rail body has a thickness defined between said outer surface and the inside surface and each of said prong-receiving notches has a depth that is less than the thickness of said rail body with a base being defined by said rail body in each of said prong-receiving notches, and each prong has a thickness measured between an inside surface thereof and an outside surface thereof that exceeds said depth.

4. The brake shoe defined in claim 1 wherein prong-receiving notches of each pair of prong-receiving notches are angled toward each other to form an angle of 60°.

5. The brake shoe defined in claim 3 wherein each anchor-receiving notch has a depth measured between a bottom thereof and said outer surface that is less than the thickness of said rail body with a base being defined by said rail body in each of said anchor-receiving notches, and each anchor has a thickness that exceeds the depth of each anchor-receiving notch.

6. The brake shoe defined in claim 5 wherein the depth of each prong-receiving notch is equal to one-half the thickness of said rail body, and the depth of each anchor-receiving notch is equal to one-half the thickness of the rail body.

7. The brake shoe defined in claim 1 further including a brake pad on each pad supporting plate.

8. The brake shoe defined in claim 7 wherein each brake pad includes at least one bevelled edge.

9. The brake shoe defined in claim 5 wherein each anchor is fixed to the bottom surface of one of said pad supporting plates to extend upward from the bottom surface of the pad supporting plate.

10. The brake shoe defined in claim 9 wherein said rails are interposed between said anchors.

11. The brake shoe defined in claim 1 wherein one of said anchors is interposed between each prong of each pair of prong-receiving notches.

\* \* \* \* \*